United States Patent
Morgan et al.

(10) Patent No.: US 8,505,018 B1
(45) Date of Patent: Aug. 6, 2013

(54) SERVER CONSOLIDATION BASED ON MINIMUM UTILIZATION

(75) Inventors: David Kenneth Morgan, Larchmont, NY (US); Anthony Francis Hutchings, Pelham, NY (US); Christopher Michael Rice, Suffern, NY (US); Michael Wiener, Larchmont, NY (US)

(73) Assignee: Bank of America Corporation, Charlotte, NC (US)

( * ) Notice: Subject to any disclaimer, the term of this patent is extended or adjusted under 35 U.S.C. 154(b) by 974 days.

(21) Appl. No.: 12/262,654

(22) Filed: Oct. 31, 2008

(51) Int. Cl.
G06F 9/46 (2006.01)

(52) U.S. Cl.
USPC .......................................... 718/104

(58) Field of Classification Search
USPC .......................................... 718/104
See application file for complete search history.

(56) References Cited

U.S. PATENT DOCUMENTS

| | | | |
|---|---|---|---|
| 7,761,548 B2 * | 7/2010 | Snyder et al. | 709/223 |
| 2008/0059972 A1 * | 3/2008 | Ding et al. | 718/105 |

* cited by examiner

*Primary Examiner* — Andrew Caldwell
*Assistant Examiner* — Benjamin Geib
(74) *Attorney, Agent, or Firm* — Michael A. Springs; Moore & Van Allen PLLC; James C. Edwards

(57) ABSTRACT

A system and methods for server consolidation are disclosed. Embodiments of the invention allow consolidation of less used technology infrastructure resulting in lower total server count. A target server list and a base server list are determined by examining CPU utilization and also by applying rating factors. The target server list includes target servers to be eliminated by transferring tasks to base servers in the base server list. Consolidation scenarios can then be identified to produce a consolidated server utilization analysis to facilitate the consolidating of interconnected servers. In at least some embodiments, the rating factors can include a minimum utilization threshold, for example, a threshold of ten percent utilization. Other factors can include server environment, server role, operating system, server location, and model technology, for example, whether the specific server hardware technology is declining or outdated.

9 Claims, 7 Drawing Sheets

| HOSTNAME | MODEL | AVG. CPU PRIME SHIFT | 90TH PERCENTILE PRIME SHIFT | AVG. CPU NON-PRIME SHIFTS | 90TH PERCENTILE NON PRIME SHIFTS | DATE PEAK HOUR CPU OCCURRED | HOUR THAT PEAK CPU OCCURRED | PEAK HOUR CPU | PLATFORM | CITY | ENVIRONMENT | ROLES |
|---|---|---|---|---|---|---|---|---|---|---|---|---|
| HOSTNAME 1 | MODEL NO. 1 | 3% | 3% | 4% | 5% | 5/7/2008 | 0 | 14% | Win2K | CITY 1 | PROD | UNKNOWN |
| HOSTNAME 2 | MODEL NO. 2 | 8% | 12% | 11% | 17% | 5/29/2008 | 17 | 98% | SunOS | CITY 2 | CONT | DATABASE |
| HOSTNAME 3 | MODEL NO. 3 | 1% | 0% | 1% | 0% | 5/19/2008 | 13 | 14% | Win2K | CITY 3 | PROD | UNKNOWN |
| HOSTNAME 4 | MODEL NO. 2 | 18% | 39% | 13% | 29% | 5/1/2008 | 0 | 85% | SunOS | CITY 4 | PROD | DATABASE |
| HOSTNAME 5 | MODEL NO. 3 | 1% | 1% | 1% | 0% | 5/9/2008 | 13 | 13% | Win2K | CITY 5 | PROD | UNKNOWN |
| HOSTNAME 6 | MODEL NO. 2 | 3% | 4% | 4% | 4% | 5/27/2008 | 1 | 11% | SunOS | CITY 6 | PROD | VERITAS NET |
| HOSTNAME 7 | MODEL NO. 2 | 3% | 6% | 5% | 9% | 5/3/2008 | 18 | 17% | Win2K | CITY 7 | PROD | UNKNOWN |
| HOSTNAME 8 | MODEL NO. 2 | 12% | 41% | 7% | 8% | 5/27/2008 | 17 | 78% | Win2K | CITY 8 | PROD | UNKNOWN |
| HOSTNAME 9 | MODEL NO. 2 | 23% | 44% | 5% | 12% | 5/2/2008 | 11 | 70% | Win2K | CITY 9 | PROD | UNKNOWN |
| HOSTNAME 10 | MODEL NO. 1 | 1% | 2% | 1% | 1% | 5/21/2008 | 16 | 4% | Win2K | CITY 10 | PROD | UNKNOWN |
| HOSTNAME 11 | MODEL NO. 1 | 0% | 1% | 0% | 1% | 5/23/2008 | 9 | 1% | SunOS | CITY 11 | TBD | UNKNOWN |
| HOSTNAME 12 | MODEL NO. 1 | 9% | 25% | 6% | 15% | 5/15/2008 | 15 | 33% | Win2K | CITY 12 | PROD | UNKNOWN |
| HOSTNAME 13 | MODEL NO. 2 | 1% | 1% | 1% | 1% | 5/23/2008 | 9 | 1% | SunOS | CITY 13 | TBD | UNKNOWN |
| HOSTNAME 14 | MODEL NO. 4 | 0% | 0% | 0% | 0% | 5/8/2008 | 23 | 1% | Win2K | CITY 14 | PROD | UNKNOWN |
| HOSTNAME 15 | MODEL NO. 2 | 3% | 4% | 4% | 4% | 5/19/2008 | 0 | 11% | Win2K | CITY 15 | PROD | CORP IT |
| HOSTNAME 16 | MODEL NO. 5 | 3% | 4% | 4% | 6% | 5/31/2008 | 2 | 17% | Win2K | CITY 16 | QA | ARM |
| HOSTNAME 17 | MODEL NO. 6 | 8% | 9% | 8% | 10% | 5/31/2008 | 3 | 18% | Win2K | CITY 17 | NON-PROD/A | UNKNOWN |
| HOSTNAME 18 | MODEL NO. 7 | 17% | 27% | 19% | 27% | 5/8/2008 | 6 | 54% | SunOS | CITY 18 | | |
| HOSTNAME 19 | MODEL NO. 2 | 5% | 6% | 5% | 6% | 5/21/2008 | 1 | 11% | Win2K | CITY 19 | | |

FIG. 3

SERVER CONSOLIDATION BASED ON MINIMUM UTILIZATION

BACKGROUND

As large enterprises have acquired more and more diverse information technology resources, dealing with large numbers of servers has become both technically and administratively cumbersome. Thus, a premium has been placed on effectively documenting and managing large numbers of servers, especially, given cost concerns, with an eye towards eliminating unnecessary host machines as more powerful, newer technology systems can be used to consolidate computing tasks.

Identifying, controlling, and reporting on the utilization of IT resources in an enterprise is essential to consolidation efforts. Consolidation in turn leads to lower electricity costs and fewer new procurement requests. Across industry today, consolidation efforts often center on capacity planning, finding patterns in data, and evaluations in connection with capital request budgets. More efficient ways to lower total server count on a more regular basis can enhance these savings.

SUMMARY

Embodiments of the present invention allow consolidation of less used technology infrastructure to lower total server count. A minimum utilization can be set to eliminate "noise" from consolidation decisions. In some embodiments, an initial server list is compiled based at least in part on central processing unit (CPU) utilization of all servers. A target server list and a base server list are determined at least in part by applying rating factors to the initial server list, wherein the target server list includes target servers to be eliminated by transferring tasks to base servers in the base server list. Consolidation scenarios can then be identified to produce a consolidated server utilization analysis to facilitate the consolidating of the interconnected servers. Consolidation of tasks can then be executed based on this analysis.

In some embodiments, as part of the utilization analysis, all timeframes can be normalized to a specified time zone. Timeframes can further be evaluated and recorded as either being prime shift or non-prime shift, where prime shift may be, for example, Monday-Friday, 8:00 A.M. to 5:00 P.M. In at least some embodiments, the rating factors can include a minimum utilization threshold, for example, a threshold of ten percent utilization. Other factors can include server environment, server role, operating system, server location, and model technology, for example, whether the specific server hardware technology is declining or outdated.

In some embodiments, a system implementing the invention includes instruction execution platforms such as computer workstations and/or servers to carry out various functions. For example, a workstation can serve as an analysis platform to access utilization data and information and determine a target server list and a base server list, as well as produce a consolidated server utilization analysis. A database housed on or with an instruction execution platform can be functionally interconnected with the plurality of geographically disbursed hubs to collect utilization data to supply to the analysis platform. Computer program code instructions in combination with the hardware of the instruction execution platforms can form the means to carry out the features and functions of embodiments of the invention.

BRIEF DESCRIPTION OF THE DRAWINGS

FIG. 3 is a table showing example CPU utilization data and other information as used with example embodiments of the invention.

DETAILED DESCRIPTION OF THE INVENTION

The following detailed description of embodiments refers to the accompanying drawings, which illustrate specific embodiments of the invention. Other embodiments having different structures and operation do not depart from the scope of the present invention.

The detailed example embodiments presented herein provide way to identify and execute cost savings by systematically reviewing current server infrastructure utilization and inventory in an enterprise operating interconnected server platforms. The term "server" and "host" can be used herein interchangeably. For purposes of the example embodiments described herein, these machines can be essentially any interconnected computer systems. The use of terms such as "server" is not meant to imply that any particular machine can only be performing host function, or that any particular machine cannot be acting as a client computing platform in any particular circumstance.

It may benefit the read to have an understanding of some terminology used in the present disclosure from this point forward. The phrase "rating factor" refers to parameters which are applied to lists of servers in order to filter these lists in order to arrive at consolidation scenarios. With respect to these lists, the term "initial server lists" and similar terms refer to lists of servers determined primarily from CPU utilization information. The term "base server" and the term referring to a list of such servers, a "base server list," refer to servers to which tasks can be moved as part of an effort to consolidate resources. Similarly, the term "target server" as well as a list of such servers, a "target server list," refer to servers which can be eliminated by moving tasks to base servers. A "minimum utilization threshold" is a percentage CPU utilization which must be achieved over some period of time in order to consider a server to be used enough so that it should not be considered as part of a consolidation scenario. Others terms have a meaning which is commonly understood in the art, or is apparent from the context in which they are used.

Figure 1:
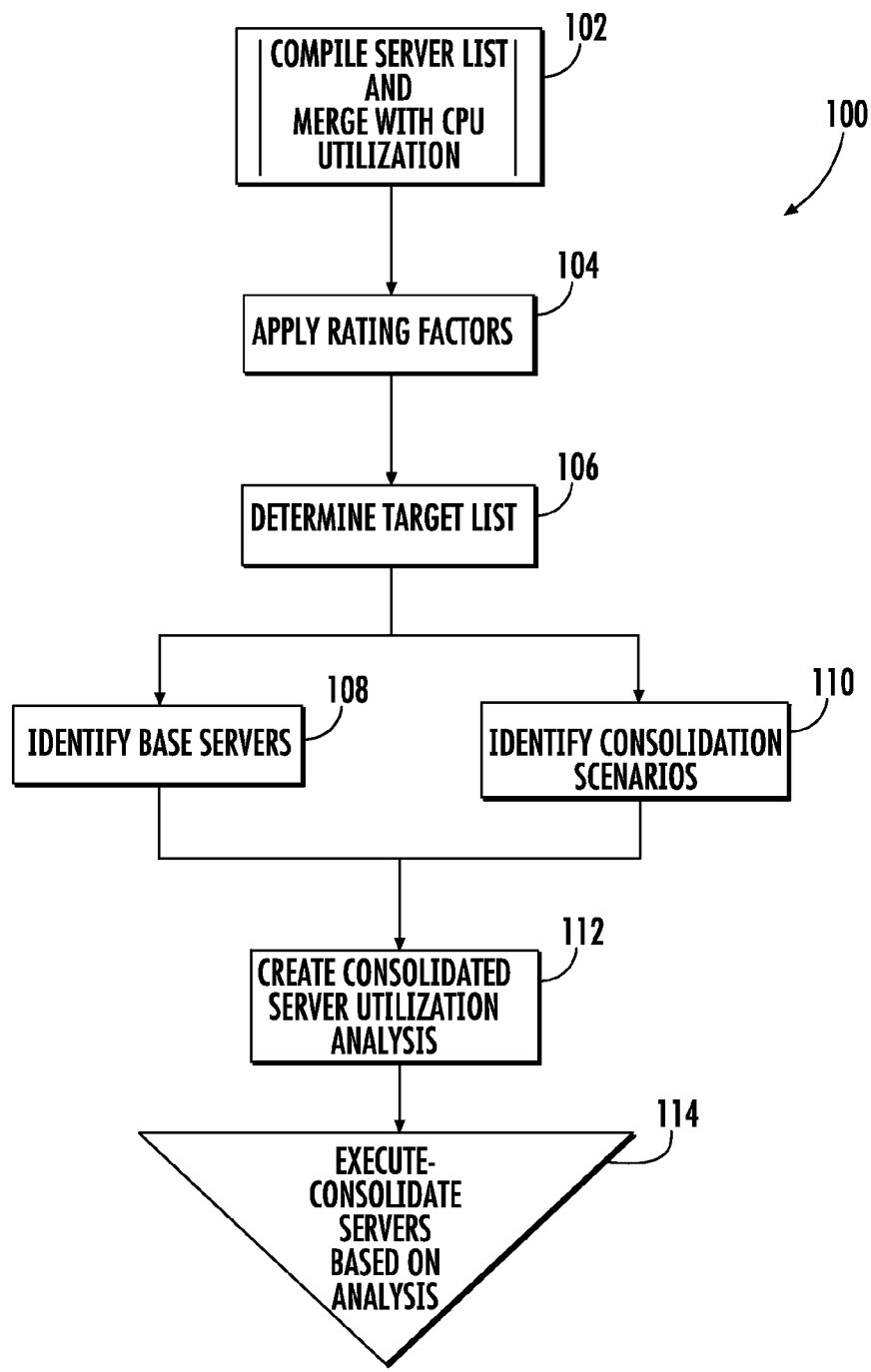
FIG. 1 is a flowchart illustrating a high-level process according to example embodiments of the invention.

FIG. 1 is a flowchart illustrating a process, 100, according to example embodiments of the invention. Like most flowchart illustrations, FIG. 1 is presented to the viewer as a series of process or sub-process blocks. Process 100 begins at block 102 where a list of interconnected servers is compiled and this list is merged with CPU utilization data to create an initial list of servers for consideration. At block 104, rating factors are applied to determine a target list at block 106. The target list is a list of servers which can be considered for consolidation/elimination based on both utilization and criteria in the rating factors.

Still referring to FIG. 1, blocks 108 and 110 may be executed simultaneously, or block 108 may be executed prior to block 110. At block 108, base servers are identified. Base server information is gathered in a base server list, where at least some base servers in the list have enough spare "horsepower" to be able to perform tasks now being performed by servers in the target server list. Moving such tasks can allow target servers to be eliminated. At block 110, consolidation scenarios are identified using information about the various servers in the base server list and the target server list. At block 112, a consolidated server utilization analysis is created. This analysis may be displayed for a user or stored in memory for further action. If there is a desire to accept and act on the server utilization analysis created in block 112, the consolidation can be executed in block 114. Consolidation involves moving tasks from target servers to base servers. Target servers which are freed up can then be eliminated from the inventory of interconnected servers. Moving tasks and functions in order to accomplish the consolidation can involve installing software, copying data, and other similar processes as is known in the art.

Figure 2:
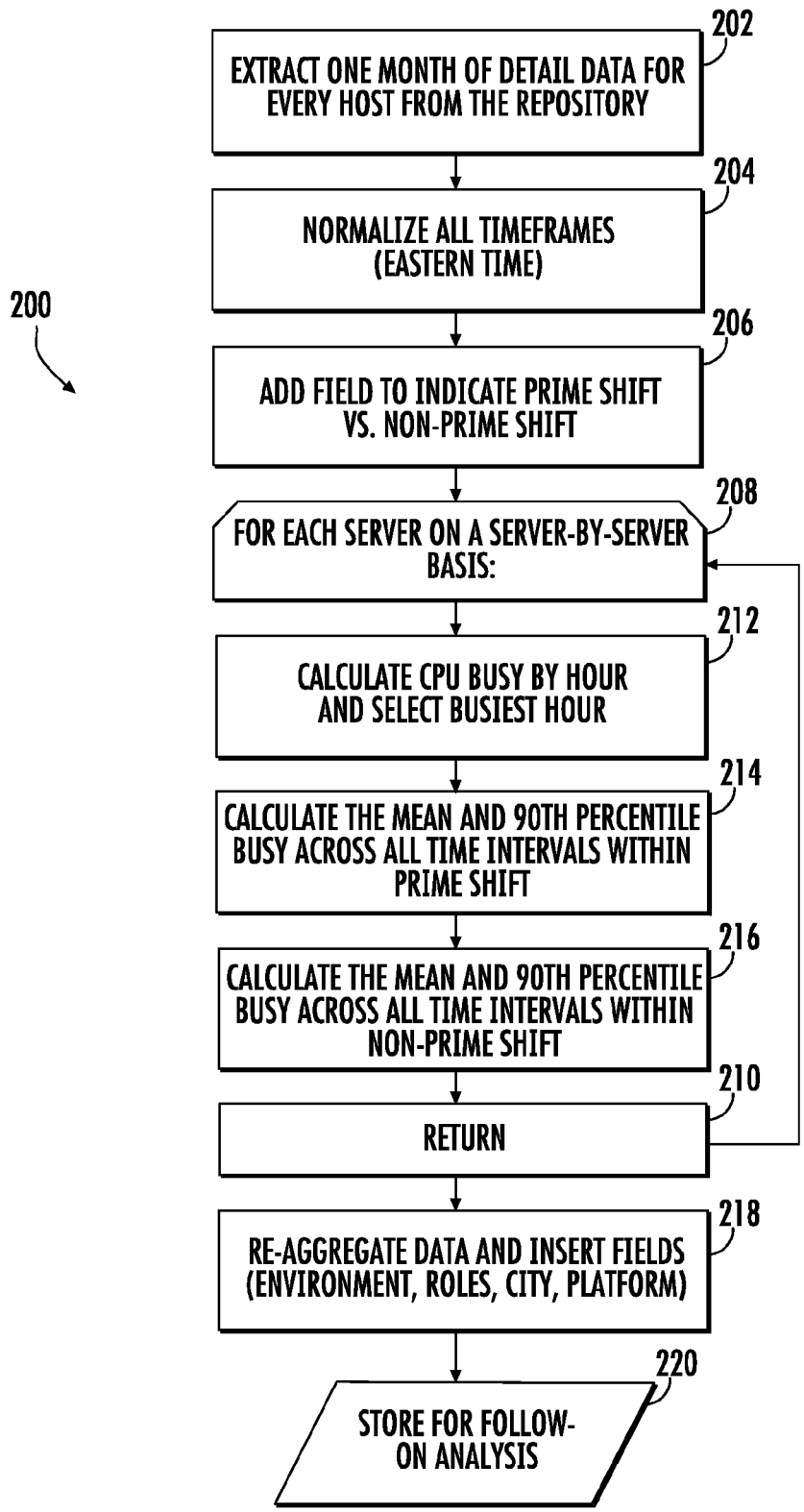
FIG. 2 is a flowchart illustrating further details of compiling a server list and merging with CPU utilization as referred to in the process of FIG. 1.

FIGS. 2 and 3 illustrate details of the compiling of the server list and merging with CPU utilization as referred to in block 102 of FIG. 1. FIG. 2 is a flowchart illustration of the process, and FIG. 3 illustrates an example of an initial server list as might be created by the process of FIG. 2. In this example embodiment, process 200 of FIG. 2 begins with block 202, where one month of detail data for every host listed in a data repository is extracted. At block 204, all timeframes are normalized to a specified time zone. For example, if the consolidation work is being done in the Eastern Time zone, and servers are distributed across the United States, all times might be normalized to the Eastern Time zone for the purposes of calculating utilization and applying rating factors. At block 206, a field is added to the data to indicate whether peak utilization for a particular server occurs during prime shift or non prime shift.

Still referring to FIG. 2, utilization calculations are performed on a server-by-server basis, as indicated by the loop formed by block 208 and return block 210. At block 212, utilization or "CPU busy" is calculated on an hour-by-hour basis and the busiest hour is selected. At block 214, the mean and $90^{th}$ percentile utilization across all time intervals within prime shift is calculated. At block 216, the mean and $90^{th}$ percentile busy across all time intervals within non-prime shift is calculated. Once all of the above calculations are performed, data is reaggragated at block 218 and fields are inserted for various rating factors so that the entire initial server list can be stored at block 220 for further analysis.

FIG. 3 illustrates an initial server list in tabular form as might be compiled according to example embodiments of the present invention. Column 302 of FIG. 3 lists the host name for each server. Column 304 lists the particular model of server for each host. Column 306 lists the average CPU time during prime shift. Column 308 lists the $90^{th}$ percentile for each machine By $90^{th}$ percentile, what is meant is the statistical measurement of 90 percent of the observations to be the given figure or less. In this particular example, prime shift is defined as Monday through Friday, 9 am to 5 pm business days, and is further normalized to U.S. Eastern Time. Columns 310 and 312, similarly, list the average CPU usage for non-prime shifts, and the $90^{th}$ percentile measurement for non-prime shifts.

Still referring to FIG. 3, Column 314 lists the date that the peak hour CPU usage occurred and Column 316 lists the hour that that peak CPU usage occurred. Column 318 lists the CPU utilization for that peak hour. Column 320 lists the platform, which is in most cases, the operating system that each server is running Column 322 lists the city where the server is located. Column 324, lists the server environment, and column 326 lists the role that the server serves within the enterprise.

Figure 4:
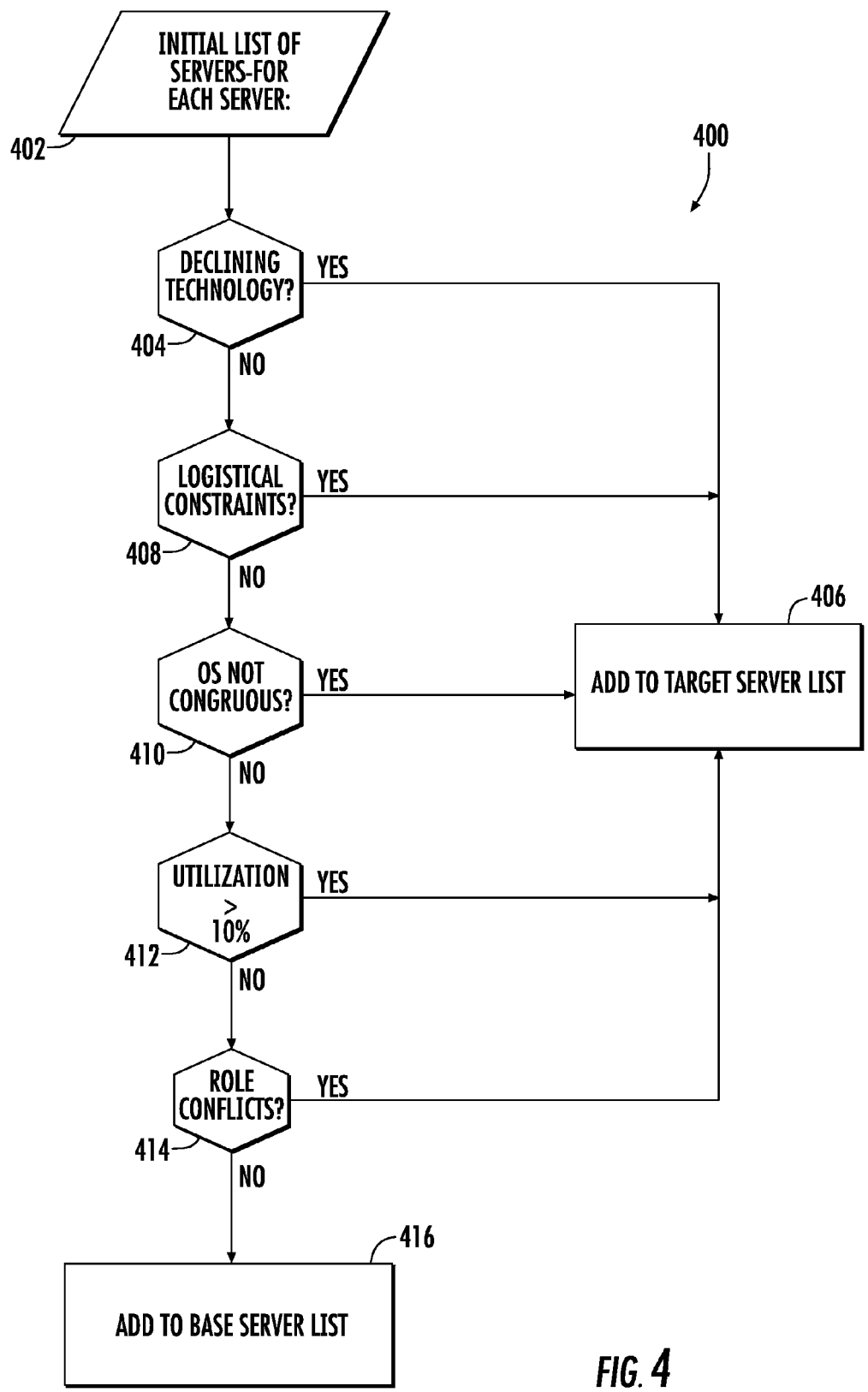
FIG. 4 is a flowchart illustrating further details of applying rating factors as referred to in the process of FIG. 1.

FIG. 4 is a flowchart illustrating how, in example embodiments, an initial list of servers can be evaluated to create a target server list and a base server list by applying rating factors. It should be remembered that FIG. 4 provides an example only. Various rating factors can be used to evaluate servers for consolidation depending on the needs of the enterprise implementing an embodiment of the invention. Process 400 of FIG. 4 takes as input the initial server list, as shown in block 402. At block 404, each server is evaluated to determine if it uses a declining technology. A declining technology might be, for example, an outdated model, or a model which uses an aging or underpowered CPU. If the server is based on declining technology, it is added to the target server list at block 406, otherwise a determination is made as to whether there are logistical constraints in keeping the server active as shown at block 408. If so, it is added to the target server list again at block 406. Otherwise processing continues.

Logistical constraints with example embodiments of the invention might include geographical location, or location within the network or the enterprise, which may in turn affect ability to maintain the server. Continuing with FIG. 4, at block 410, a determination is made as to whether or not the operating system is congruous. An operating system is said to be congruous when the system stack is standard so that applications it supports can be easily merged. A valid, standard operating system would usually be congruous. If the operating system is not congruous, the server is added to the target server list, again at block 406. Otherwise processing continues.

Still referring to FIG. 4, at block 412, utilization is evaluated with a minimum threshold of ten percent. If utilization is above ten percent, the server can be considered for the target server list at block 406. The server should only be considered for the base server list if utilization is below ten percent, so that the server has enough capacity on which to consolidate tasks. At block 414, the server is evaluated to determine whether there are any role conflicts. For example, there may be a desire to exempt a server from consolidation efforts if the server fills a disaster recovery role. Finally, servers that are not added to the target server list are added to the base server list at block 416.

Figure 5:
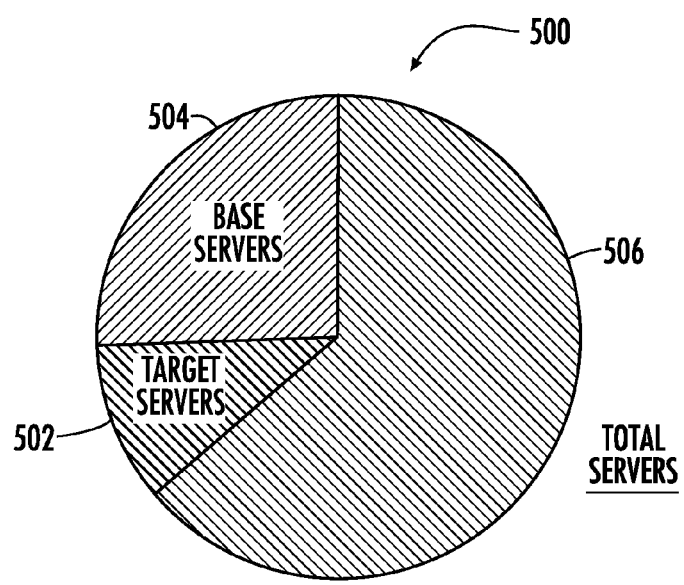
FIG. 5 is a pie chart that graphically represents an example relationship between base servers, target servers and all interconnected servers according to at least some embodiments of the present invention.

FIG. 5 is a pie chart illustrating the state of stored server information once the rating factors have been applied as previously discussed. Chart 500 represents all or substantially all of the interconnected servers in the enterprise. Portion 502 represents the portion of the total servers that are on the target server list. Portion 504 represents the portion of the total servers that are on the base server list. Portion 506 represents the portion of the total servers which are not involved in the present consolidation effort.

Figure 6:
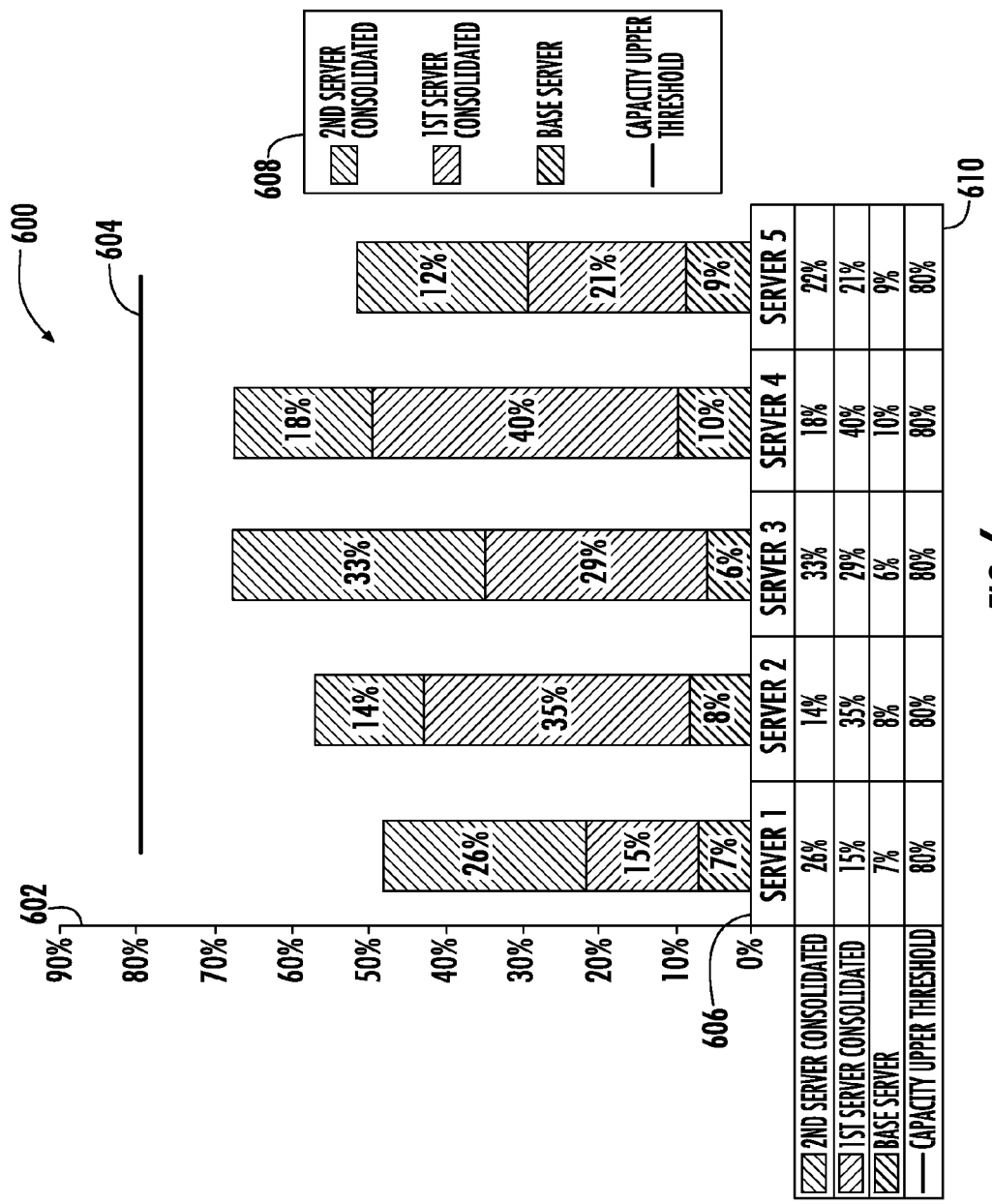
FIG. 6 is a bar chart and accompanying legends illustrating an example consolidated server utilization analysis according to at least some embodiments of the present invention.

FIG. 6 presents a screen display, 600, of a consolidated server utilization analysis for five servers as an example of the type of analysis that can be output by an embodiment of the present invention. It should be noted that although display 600 of FIG. 6 is presented primarily as a bar graph, any other type of display, graphical or text based, can form the consolidated server utilization analysis according to an embodiment of the present invention. In the bar graph portion of FIG. 6, vertical axis 602 lists processor utilization in percent. Line 604 represents the upper threshold of the capacity which will be permitted as servers are consolidated. Because there may be peaks of utilization higher than what has been taken into account during the analysis, it is desirable to leave some "headroom" for higher utilization. Horizontal axis 606 lists the base servers being used for a proposed consolidation. Key 608 lists the cross-hatching pattern used to designate the portions of the various bars for the original base server load, the load from a first server consolidated onto a base server from the target server list, and a load of a second server consolidated onto a base server from the target server list, respectively. Table 610 lists the same information as is shown graphically, but in tabular form for convenience.

Still referring to FIG. 6, it should be noted that the percentage utilization shown in this bar graph represents a percentage utilization relative to the base server. Since it is likely that target servers have less capability than base servers, these percentage utilizations of base servers would be lower, in some cases, much lower, that the percentage utilization on the target server where the task was being performed originally. Server utilization numbers are normalized using the "spec rate" published via the well known "spec.org" organization. "SPEC" is an acronym "Standard Performance Evaluation Corporation" and is a non-profit corporation formed to establish, maintain and endorse a standardized set of relevant benchmarks that can be applied to computers. SPEC develops benchmark software suites and also reviews and publishes submitted results from various organizations that characterize the performance capabilities of various computing platforms. It should also be noted that all of the base server utilizations in FIG. 6 are ten percent or below due to the ten percent minimum threshold, which has been previously discussed.

Continuing with FIG. 6, one can see that server 1 originally had 7% utilization. Tasks from the first target server being consolidated onto server 1 result in an additional 15% utilization. Tasks from the second target server being consolidated onto server 1 result in an additional 26% utilization. Similarly, for server 2, the base server exhibited 8% CPU utilization, tasks from the first server cause 35% additional utilization, and tasks from the second server cause 14% additional utilization. In the case of server 3, the base server was already being used at 6%, tasks from the first target server to be consolidated result in 29% additional utilization, and tasks resulting from the second target server to be consolidated result in 33% additional utilization. With server 4, the base server utilization was 10%, 40% utilization is added by the first target server consolidated, and 18% utilization is added by the second target server consolidated. Finally, in the case of server 5, the base server was at 9% utilization, the first target server consolidated adds 21% to the utilization, and the second target server consolidated on to server 5 increases the utilization of server 5 by 22%.

Figure 7:
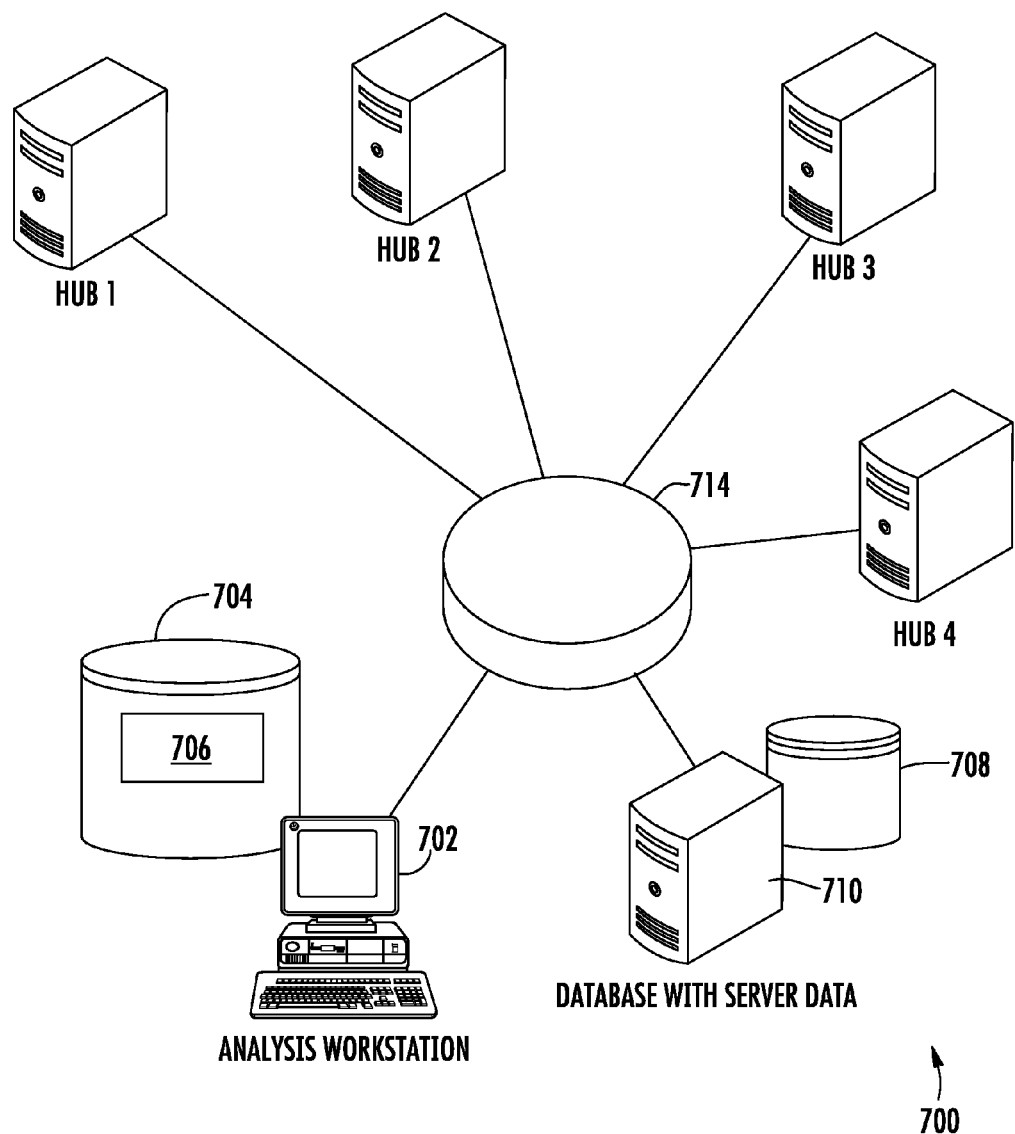
FIG. 7 is a hardware block diagram that schematically illustrates a system and operating environment for at least some embodiments of the present invention.

FIG. 7 illustrates a typical operating environment for embodiments of the present invention. System 700 includes instruction execution platforms such as computer workstations and/or servers to carry out various functions. Analysis workstation 702 can be a workstation, personal computer, or other computing/instruction execution platform, and may also be referred to herein as an "analysis platform." This platform includes a fixed storage medium, illustrated graphically at 704, for analysis software 706 or other programs, which enable the use of an embodiment of the invention. In some embodiments graphical plots or other forms of consolidated server utilization analysis might also be stored on fixed storage medium 704.

A database, 708, housed on or with instruction execution platform 710 can be functionally interconnected with the plurality of geographically disbursed hubs to collect utilization data to supply to the analysis platform. In this particular example the geographically disbursed hubs include hub 1, hub 2, hub 3 and hub 4. The connection between the hubs, the database and the analysis platform or workstation can be formed in part by network 714, which can be an intranet, virtual private network (VPN) connection, local area network (LAN) connection, or any other type of network resources, including the Internet.

In example embodiments, the collection process is carried out by a set of programs that run on each collection hub. Each hub captures the performance data for the previous day. Routines can be in place to capture missed days as well as to capture performance data during the day if needed. Each individual host runs standard system utilities provided by the host operating system. Standard system utilities are used to ensure no possibility of crashing and to ensure data validity, and the files from these system utilities are collected by the hubs.

The database then reads these files and captures selected metrics, for example, in this case, CPU time. The database creates one record for each host-metric combination and then stores the individual metric in a comma separated time series data element. The time series is kept with five minute granularity. This structure can conserve space and optimize query response time with a large number of hosts. The database stores all data according to a GMT clock but maintains a record as to the local time offset for the server.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-readable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the computer executable instructions stored in the computer readable memory produce an article of manufacture including instruction means which implement the function/act specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A computer-implemented method of consolidating a network of interconnected servers comprising:

compiling, by one or more computing device processors, an initial server list based at least in part on central processing unit (CPU) utilization, wherein the server list includes a plurality of servers in the network of interconnected servers, wherein compiling the initial server list includes (1) extracting, for each of the plurality of servers, CPU utilization data over a specified period of time, (2) normalizing a timeframe for each of the plurality of servers and (3) indicating, for each of the plurality of servers, in the initial server list whether peak utilization occurs during a prime work shift on a non-prime work shift;

determining, by one or more computing device processors, CPU utilization for each of the plurality of servers on an hour-by-hour basis and identifying a busiest CPU utilization hour for each of the plurality of servers;

determining, by one or more computing device processors, a mean and a predetermined peak percentile utilization for each of the plurality of servers across all hour-by-hour time intervals within the prime work shift and within the non-prime work shift;

determining, by one or more computing device processors, a target server list and a base server list at least in part by applying rating factors to the initial server list, wherein the target server list includes target servers to be eliminated by transferring tasks performed on the target servers to base servers in the base server list and wherein the rating factors include minimum utilization threshold and currency of technology;

identifying consolidation scenarios based on information associated with the target servers in the target server list and the base servers in the base server list, wherein the information includes the busiest CPU utilization hour for each of the plurality servers, and the mean and the predetermined peak percentile utilization for each of the plurality servers across all hour-by-hour time intervals within the prime work shift and within the non-prime work shift;

generating, by one or more computing device processors, a consolidated server utilization analysis based on the identified consolidation scenarios, wherein the consolidated server utilization analysis facilitates the consolidating of the interconnected servers by moving tasks from one or more of the target servers to one or more of the base servers; and eliminating at least one of the one or more target servers from the network of interconnected servers in response to the consolidated server utilization analysis.

2. The method of claim 1 wherein the minimum utilization threshold is ten percent, such that each of the plurality of servers having a utilization above ten percent are considered for the target server list and each of the plurality of servers having a utilization below ten percent are considered for the base server list.

3. The method of claim 1, wherein the rating factors further include at least one of environment, role, operating system, or location.

4. The method of claim 2 wherein the rating factors further include at least one of environment, role, operating system, or location.

5. A non-transitory computer-readable storage medium having computer program code for consolidating a network interconnected servers, the computer program code comprising:
- instructions for compiling an initial server list based at least in part on central processing unit (CPU) utilization wherein the server list includes a plurality of servers in the network of interconnected servers, wherein the instructions for compiling include (1) extracting, for each of the plurality of servers, CPU utilization data over a specified period of time, (2) normalizing a timeframe for each of the plurality of servers and (3) indicating, for each of the plurality of servers, in the initial server list whether peak utilization occurs during a prime work shift on a non-prime work shift;
- instructions for determining CPU utilization for each of the plurality of servers on an hour-by-hour basis and identifying a busiest CPU utilization hour for each of the plurality of servers;
- instructions for determining a mean and a predetermined peak percentile utilization for each of the plurality of servers across all hour-by-hour time intervals within a prime work shift and within a non-prime work shift;
- instructions for determining a target server list and a base server list at least in part by applying rating factors to the initial server list, wherein the target server list includes target servers to be eliminated by transferring tasks performed on the target servers to base servers in the base server list and wherein the rating factors include minimum utilization threshold and currency of technology;
- instructions for identifying consolidation scenarios based on information associated with the target servers in the target server list and the base servers in the base server list, wherein the information includes the busiest CPU utilization hour for each of the plurality of servers, and the mean and the predetermined peak percentile utilization for each of the plurality of servers across all hour-by-hour time intervals within the prime work shift and within the non-prime work shift;
- instructions for generating a consolidated server utilization analysis based on the identified consolidation scenarios, wherein the consolidated server utilization analysis facilitates the consolidating of the interconnected servers by moving tasks from one or more of the target servers to one or more of the base servers; and
- instructions for initiating elimination of at least one of the one or more target servers from the network of interconnected servers in response to the consolidated server utilization analysis.

6. The computer-readable storage medium of claim 5 wherein the minimum utilization threshold is ten percent, such that each of the plurality of servers having a utilization above ten percent are considered for the target server list and each of the plurality of servers having a utilization below ten percent are considered for the base server list.

7. The computer-readable medium of claim 5 wherein the computer program code further comprises instruction for indicating utilization during the prime work shift.

8. Apparatus for consolidating a network of interconnected servers in comprising:
- means for compiling an initial server list based at least in part on central processing unit (CPU) utilization, wherein the server list includes a plurality of servers in the network of interconnected servers, wherein compiling the initial server list includes (1) extracting, for each of the plurality of servers, CPU utilization data over a specified period of time, (2) normalizing a timeframe for each of the plurality of servers and (3) indicating, for each of the plurality of servers, in the initial server list whether peak utilization occurs during a prime work shift on a non-prime work shift;
- means for determining, by one or more computing device processors, CPU utilization for each of the plurality of servers on an hour-by-hour basis and identifying a busiest CPU utilization hour for each of the plurality of servers;
- means for determining, by one or more computing device processors, a mean and a predetermined peak percentile utilization for each of the plurality of servers across all hour-by-hour time intervals within a prime work shift and within a non-prime work shift;
- means for determining a target server list and a base server list at least in part by applying rating factors to the initial server list, wherein the target server list includes target servers to be eliminated by transferring tasks performed on the target servers to base servers in the base server list and wherein the rating factors include minimum utilization threshold and currency of technology;
- means for identifying consolidation scenarios based on information associated with the target servers in the target server list and the base servers in the base server list, wherein the information includes the busiest CPU utilization hour for each of the plurality of servers, and the mean and the predetermined peak percentile utilization for each of the plurality of servers across all hour-by-hour time intervals within the prime work shift and within the non-prime work shift;
- means for generating a consolidated server utilization analysis based on the identified consolidation scenarios, wherein the consolidated server utilization analysis facilitates the consolidating of the interconnected servers by moving tasks from one or more of the target servers to one or more of the base servers;
- means for initiating elimination of at least one of the one or more target servers from the network of interconnected servers in response to the consolidated server utilization analysis.

9. The apparatus of claim 8 further comprising means for indicating utilization during the prime work shift.

* * * * *